(12) United States Patent (10) Patent No.: US 12,676,498 B2

Ohashi (45) Date of Patent: Jul. 7, 2026

---

(54) BACKUP POWER SUPPLY

(71) Applicant: Panasonic Energy Co., Ltd., Osaka (JP)

(72) Inventor: Osamu Ohashi, Osaka (JP)

(73) Assignee: Panasonic Energy Co., Ltd., Osaka (JP)

( * ) Notice: Subject to any disclaimer, the term of this patent is extended or adjusted under 35 U.S.C. 154(b) by 40 days.

(21) Appl. No.: 18/846,646

(22) PCT Filed: Jan. 19, 2023

(86) PCT No.: PCT/JP2023/001563

§ 371 (c)(1),
(2) Date: Sep. 12, 2024

(87) PCT Pub. No.: WO2023/181612

PCT Pub. Date: Sep. 28, 2023

(65) Prior Publication Data

US 2025/0266709 A1 Aug. 21, 2025

(30) Foreign Application Priority Data

Mar. 23, 2022 (JP) ................................. 2022-047074

(51) Int. Cl.
H02J 9/06 (2006.01)

(52) U.S. Cl.
CPC ..................................... H02J 9/061 (2013.01)

(58) Field of Classification Search
CPC ...................................................... H02J 9/061

(Continued)

(56) References Cited

U.S. PATENT DOCUMENTS

| | | | |
|---|---|---|---|
| 8,242,750 B2 * | 8/2012 | Li | G05B 15/02 |
| | | | 307/64 |
| 2013/0135911 A1 * | 5/2013 | Lee | H02M 7/04 |
| | | | 363/126 |

(Continued)

FOREIGN PATENT DOCUMENTS

JP 2018-169238 11/2018

OTHER PUBLICATIONS

International Search Report of PCT application No. PCT/JP2023/001563 dated Apr. 11, 2023.

*Primary Examiner* — Michael R. Fin

(74) *Attorney, Agent, or Firm* — Rimon P.C.

(57) ABSTRACT

A backup power supply includes: a battery module; an MPU; a first power supply circuit configured to supply a power supply voltage from the battery module to the MPU via a switching element; a second power supply circuit configured to convert external power into the power supply voltage to supply the power supply voltage to the MPU, the external power being supplied from a main power supply of an external load connected; and a power supply switching circuit configured to detect an input of the external power so as to control the switching element. the power supply switching circuit is configured to: in an input period during which the external power is supplied, turn off the switching element to stop supplying the power supply voltage from the first power supply circuit and to supply the power supply voltage from the second power supply circuit to the MPU; and in a non-input period during which the external power is not supplied, turn on the switching element to supply the power supply voltage from the first power supply circuit to the MPU.

9 Claims, 2 Drawing Sheets

(58) Field of Classification Search
USPC ........................................................ 307/23
See application file for complete search history.

(56) References Cited

U.S. PATENT DOCUMENTS

2022/0158480 A1\*  5/2022  Sasahara ............... H02J 7/0048
2022/0350389 A1\*  11/2022  Soffer ................... G06F 1/3215

\* cited by examiner

BACKUP POWER SUPPLY

TECHNICAL FIELD

The present disclosure relates to a backup power supply including a battery module, and particularly to a backup power supply including a micro-processing unit (MPU) configured to manage the state of the battery module.

BACKGROUND ART

In a power supply device including a battery module, a micro-processing unit (MPU) is included to prevent over-charge and over-discharge of the battery module and to determine, for example, the degree of degradation of the battery module. (PTL 1) In the description of the present disclosure, the MPU includes a micro controller unit (MCU).

A backup power supply includes a battery module configured to supply power to a connected external load to keep the external load in an operating state in the event of a power failure. The backup power supply is required to be healthy to provide a stable supply voltage from the battery module to the external load in the event of a power failure. The backup power supply includes a MPU configured to monitor the state of the battery module to manage the battery module and keep the battery module healthy. The MPU is maintained in an operating state by the power supply voltage supplied from the battery module. This configuration causes the MPU to discharge the battery module, reducing remaining capacity of the battery module. Since the backup power supply is always connected to an external load, the power consumption of the battery module is reduced by supplying the power supply voltage from the main power supply provided in the external load to the MPU. The backup power supply supplies power to an external load only in the event of a power failure. However, power is rarely supplied to the external load in the event of a power failure. Hence, by supplying the power supply voltage to the MPU from the main power supply in a normal state during which no power failure occurs, the consumption of the power from the battery module for the MPU can be reduced.

The backup power supply configured to supply a power supply voltage to the MPU from both the battery module and the main power supply includes a power supply circuit, such as a DC-to-DC converter configured to adjust the voltage of the main power supply and the voltage of the battery module for conversion into the power supply voltage of the MPU. In such a backup power supply, the power consumption of the backup power supply itself is required to be small out of the power of the battery module to allow the external load to be powered even at the time of a long power failure.

CITATION LIST

Patent Literature

PTL 1: Japanese Patent Laid-Open Publication No. 2018-169238

SUMMARY OF INVENTION

A backup power supply according to one aspect of the present disclosure includes: a battery module including a plurality of battery cells; a micro-processing unit (MPU) connected to the battery module; a first power supply circuit configured to supply a power supply voltage from the battery module to the MPU, the power supply voltage powering the MPU; a switching element configured to supply the power supply voltage from the first power supply circuit to the MPU; a second power supply circuit configured to convert external power into the power supply voltage to supply the power supply voltage to the MPU, the external power being supplied from a main power supply of an external load connected; and a power supply switching circuit configured to detect an input of the external power from the main power supply of the external load to the backup power supply so as to control the switching element. The power supply switching circuit is configured to, in an input period during which the external power is supplied from the external load, turn off the switching element to stop supplying the power supply voltage from the first power supply circuit to the MPU and to supply the power supply voltage from the second power supply circuit to the MPU. The power supply switching circuit is configured to, in a non-input period during which the external power is not supplied from the external load, turn on the switching element to supply the power supply voltage from the first power supply circuit to the MPU.

The backup power supply described above efficiently supplies the power supply voltage to the MPU from both the battery module and the main power supply while reducing the power consumption of the battery module.

DESCRIPTION OF EMBODIMENT

Figure 1:
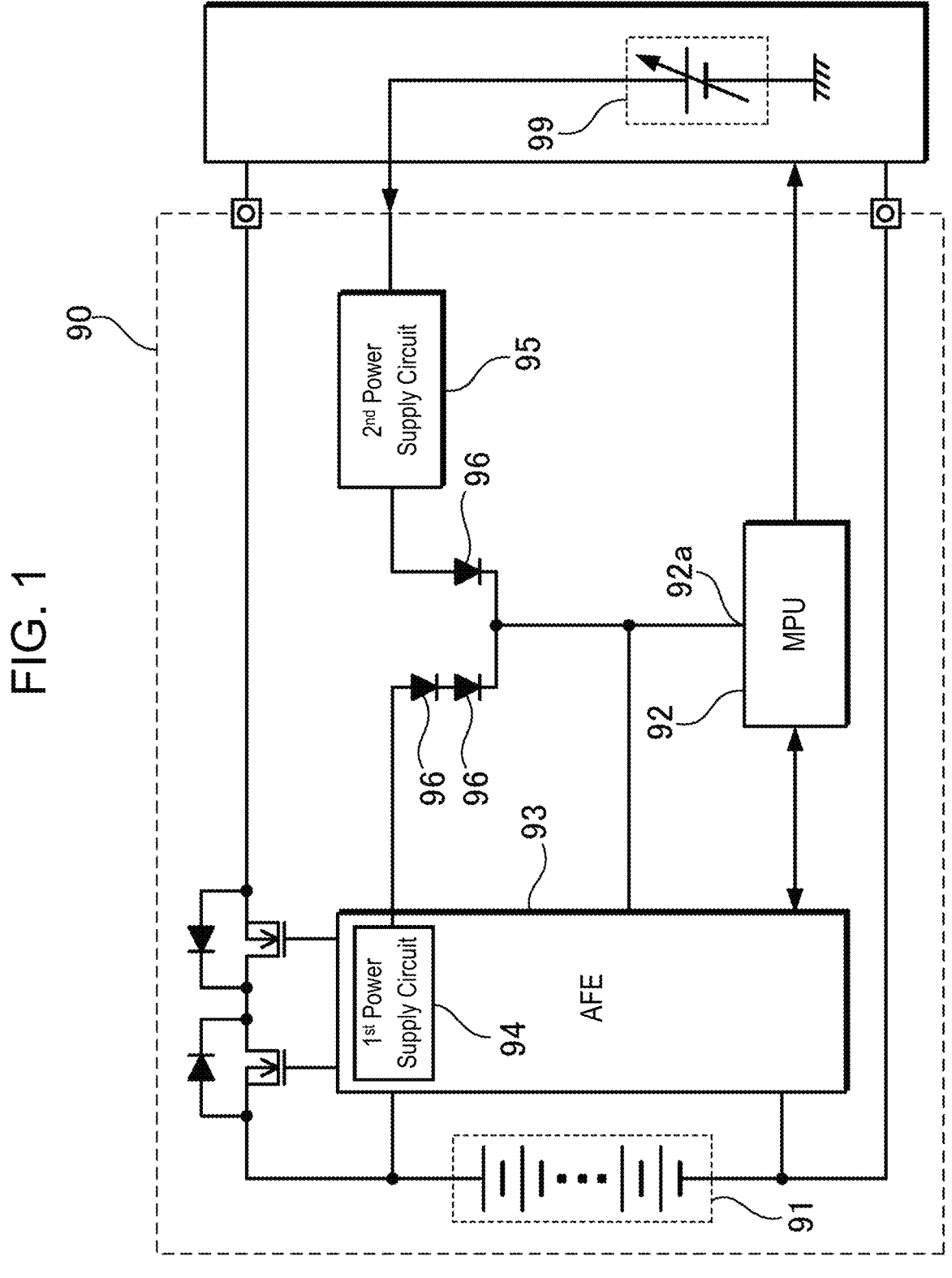
FIG. 1 is a circuit diagram of a backup power supply according to a comparative example.

FIG. 1 is a circuit diagram of backup power supply 90 according to a comparative example, in which the voltage is adjusted and supplied to MPU 92 from battery module 91 and main power supply 99. Backup power supply 90 includes a first power supply circuit in analog front end (AFE) 93. The first power supply circuit is configured to adjust the voltage of battery module 91 and supple the adjusted voltage to MPU 92. Backup power supply 90 further includes second power supply circuit 95 configured to adjust the voltage of the external power input from main power supply 99 and supply the adjusted voltage to MPU 92. In backup power supply 90, first power supply circuit 94 and second power supply circuit 95 are connected to power supply terminal 92a of MPU 92 via diodes 96.

In backup power supply 90 illustrated in FIG. 1, in order to supply power supply voltage to MPU 92 from second power supply circuit 95 while the power supply voltage is supplied to MPU 92 from both first power supply circuit 94 and second power supply circuit 95, two diodes 96 connected in series to each other to an output side of first power supply circuit 94, and second power supply circuit 95 supplies the power supply voltage to MPU 92 via single diode 96. Since a voltage drop across a diode ranges from about 0.6 V to 0.7 V, a voltage drop of two diodes 96 connected in series to each other is high ranging from 1.2 V to 1.4 V. While power supply voltage is supplied from both first power supply circuit 94 and second power supply circuit 95 in a period during which external power is supplied, power supply voltage is supplied to MPU 92 from second power supply circuit 95 via diode 96 having a smaller voltage drop. In a period during which external power is not supplied, a power supply voltage is not output from second power supply circuit 95, and is supplied to MPU 92 from first power supply circuit 94.

In backup power supply 90, in the period during which external power is not supplied, power supply voltage is supplied from the first power supply circuit to the MPU. In the period during which external power is supplied and power supply voltage is output from the second power supply circuit, the power supply voltage is supplied from the second power supply circuit to the MPU while the power supply voltage is not supplied from the first power supply circuit to the MPU. In the period during which external power is supplied, the diodes switch between the power supply circuits, such that the power supply voltage is supplied from the second power supply circuit to the MPU. This circuit configuration may be a simple circuit configuration in which the supply of the power supply circuit is selected by the number of diodes. However, diodes wastefully consume power due to a large voltage drop of the diodes. In the period during which the power supply voltage is supplied from the second power supply circuit to the MPU, the diodes wastefully consume power.

A backup power supply according to one aspect of the present disclosure includes: a battery module including a plurality of battery cells; a micro-processing unit (MPU) connected to the battery module; a first power supply circuit configured to supply a power supply voltage from the battery module to the MPU, the power supply voltage powering the MPU; a switching element configured to supply the power supply voltage from the first power supply circuit to the MPU; a second power supply circuit configured to convert external power into the power supply voltage to supply the power supply voltage to the MPU, the external power being supplied from a main power supply of an external load connected; and a power supply switching circuit configured to detect an input of the external power from the main power supply of the external load to the backup power supply so as to control the switching element. The power supply switching circuit is configured to, in an input period during which the external power is supplied from the external load, turn off the switching element to stop supplying the power supply voltage from the first power supply circuit to the MPU and to supply the power supply voltage from the second power supply circuit to the MPU. The power supply switching circuit is configured to, in a non-input period during which the external power is not supplied from the external load, turn on the switching element to supply the power supply voltage from the first power supply circuit to the MPU.

In the backup power supply described above, in the input period during which the external power is supplied, the power supply switching circuit causes the second power supply circuit to adjust the voltage of the external power to supply the power supply voltage to the MPU, turns off the switching element that supplies the power supply voltage from the first power supply circuit to the MPU so as to stop supplying the power supply voltage from the first power supply circuit to the MPU. In the non-input period during which the external power is not supplied, the power supply switching circuit turns on the switching element to supply the power supply voltage from the first power supply circuit to the MPU and maintain the MPU in an operating state. In the backup power supply, in the input period during which the external power is supplied from the external load, the second power supply circuit adjusts the voltage of the external power supplied from the external load and supplies the voltage to the MPU, so that the power consumption of the battery module during this period is reduced. In the non-input period during which external power is not input, the first power supply circuit adjusts the voltage of the output of the battery module and supplies the voltage to the MPU to always maintain the MPU to operate.

The backup power supply described above switches the supply of the power supply voltage to the MPU. Therefore, the power supply voltage is efficiently supplied to the MPU from one of the external load and the battery module without supplying the power supply voltage to the MPU via diodes from the first power supply circuit and the second power supply circuit as in conventional circuitry. Furthermore, in the input period during which the external power is supplied from the external load, the power supply voltage may not necessarily be supplied from the battery module to the MPU. Therefore, the MPU is maintained to operate while significantly reducing the power consumption of the battery module. In particular, in the backup power supply, most of the time is the input period during which the external power is supplied from the external load. Therefore, the time period during which the power supply voltage is supplied from the battery module to the MPU is extremely short, and the power consumption of the battery module is significantly reduced while always maintaining the MPU to operate.

In the backup power supply according to another aspect of the present disclosure, the second power supply circuit may be configured to start outputting the power supply voltage to the MPU in response to an activation signal causing the power supply switching circuit to turn off the switching element.

In the backup power supply described above, the second power supply circuit starts outputting the power supply voltage to the MPU in response to an activation signal to turn off the switching element that controls a supply of the power supply voltage from the first power supply circuit to the MPU. Accordingly, at the time of switching between the first power supply circuit and the second power supply circuit, the power supply voltage is prevented from being supplied to the MPU from both of the first power supply circuit and the second power supply circuit simultaneously, and is supplied to the MPU from one of the power supply circuits. It is not possible to make the output voltage of the first power supply circuit completely equal to the output voltage of the second power supply circuit. Therefore, backup power supply 90 according to the comparative example provides a problem that, a voltage higher than the output is supplied to the output side of the power supply circuit that outputs a lower voltage. In the backup power supply according to the aspect, the second power supply circuit starts output in response to an activation signal so as to cause the switching element to stop the output of the first power supply circuit. Accordingly, the first power supply circuit and the second power supply circuit do not supply the power supply voltage to the MPU simultaneously. This configuration eliminates the problem that a voltage higher than the output is input to the first power supply circuit and the second power supply circuit.

In the backup power supply according to another aspect of the present disclosure, the power supply switching circuit may include a trigger circuit configured to output an activation signal when a voltage of the external power exceeds a threshold. The power supply switching circuit may be configured to turn off the switching element in response to the activation signal output from the trigger circuit to cause the second power supply circuit to start supplying the power supply voltage to the MPU.

In the backup power supply described above, even when external power that has a time delay in voltage increase is input to the second power supply circuit, the power supply voltage starts to be supplied from the second power supply circuit to the MPU after the external power reaches a predetermined voltage. Accordingly, it is possible to supply a predetermined power supply voltage from the second power supply circuit to the MPU, and to simultaneously cause the switching element to stop supplying power from the first power supply circuit to the MPU.

In the backup power supply according to another aspect of the present disclosure, the second power supply circuit may include: a DC-to-DC converter configured to operate upon receiving the external power from the main power supply of the external load; and a control terminal configured to supply an output of the DC-to-DC converter to the MPU in response to an input of the activation signal. The DC-to-DC converter may be configured to start outputting the power supply voltage to the MPU in response to the activation signal input to the control terminal. The switching element may be configured to be turned off in response to the activation signal.

In the backup power supply described above, the DC-to-DC converter operates in the period during which the external power is supplied to gradually increase the output voltage. After that, an activation signal is input to the control terminal, and the second power supply circuit supplies the power supply voltage to the MPU. Accordingly, even while external power with a time delay in voltage increase is input, the DC-to-DC converter of the second power supply circuit supplies a predetermined power supply voltage to the MPU.

In the backup power supply according to another aspect of the present disclosure, the power supply switching circuit may further include a trigger circuit configured to output a stop signal when a voltage of the external power becomes equal to or less than a threshold. The switching element may be configured to be switched from being turned off to being turned on in response to the stop signal so as to cause the first power supply circuit to supply the power supply voltage to the MPU.

In the backup power supply described above, at the time when the input period is switched to the non-input period, the first power supply circuit outputs the power supply voltage to the MPU while the output voltage of the second power supply circuit has decreased to a predetermined voltage. Accordingly, it is possible to prevent both of the power supply circuits from supplying power supply voltage with a substantially-equal voltage difference to the MPU.

The backup power supply according to another aspect of the present disclosure may further include a capacitor connected to an output side of the second power supply circuit. The capacitor is configured to reduce a change in the power supply voltage supplied from the second power supply circuit to the MPU.

In the backup power supply described above, at the time of switching between the first power supply circuit and the second power supply circuit, the power supply voltage is supplied to the MPU stably while the capacitor reduces a change in the power supply voltage to the MPU.

In the backup power supply according to another aspect of the present disclosure, the capacitor has a capacitance of 0.45 μF or more.

In the backup power supply according to another aspect of the present disclosure, the power supply switching circuit operates with the external power as the power supply voltage.

In the backup power supply described above, the power supply switching circuit is powered by the external power. Accordingly, it is possible to switch the power supply voltage of the MPU between the battery module and the external power while preventing the power supply switching circuit from consuming the power of the battery module.

In the backup power supply according to another aspect of the present disclosure, the power supply voltage supplied from each of the first power supply circuit and the second power supply circuit to the MPU may be 5 V.

The present disclosure will be detailed below with reference to the drawings. In the following description, when appropriate, terms which indicate specific directions or locations (for example, "up," "down," and other terms expressing those) may be applied. However, those terms are used for easy understanding of the invention with reference to the accompanying drawings, and thus the technical scope of the present invention shall not be limited by the meaning of those terms. In addition, like numerals appearing in different drawings indicate like parts or members.

Moreover, the embodiment described below illustrates a specific example of the technical idea of the present invention, and the present invention is not limited to the description below. Unless otherwise specified, any dimensions, materials, shapes, and relative arrangements of the structural components described below are given as an example and not as a limitation of the scope of the present invention. In addition, the description in one embodiment or examples may be applied to other embodiments or examples, Additionally, the sizes, the positional relations and the like of the members illustrated in the drawings may be exaggerated in order to clarify the explanation.

Exemplary Embodiment 1

Figure 2:
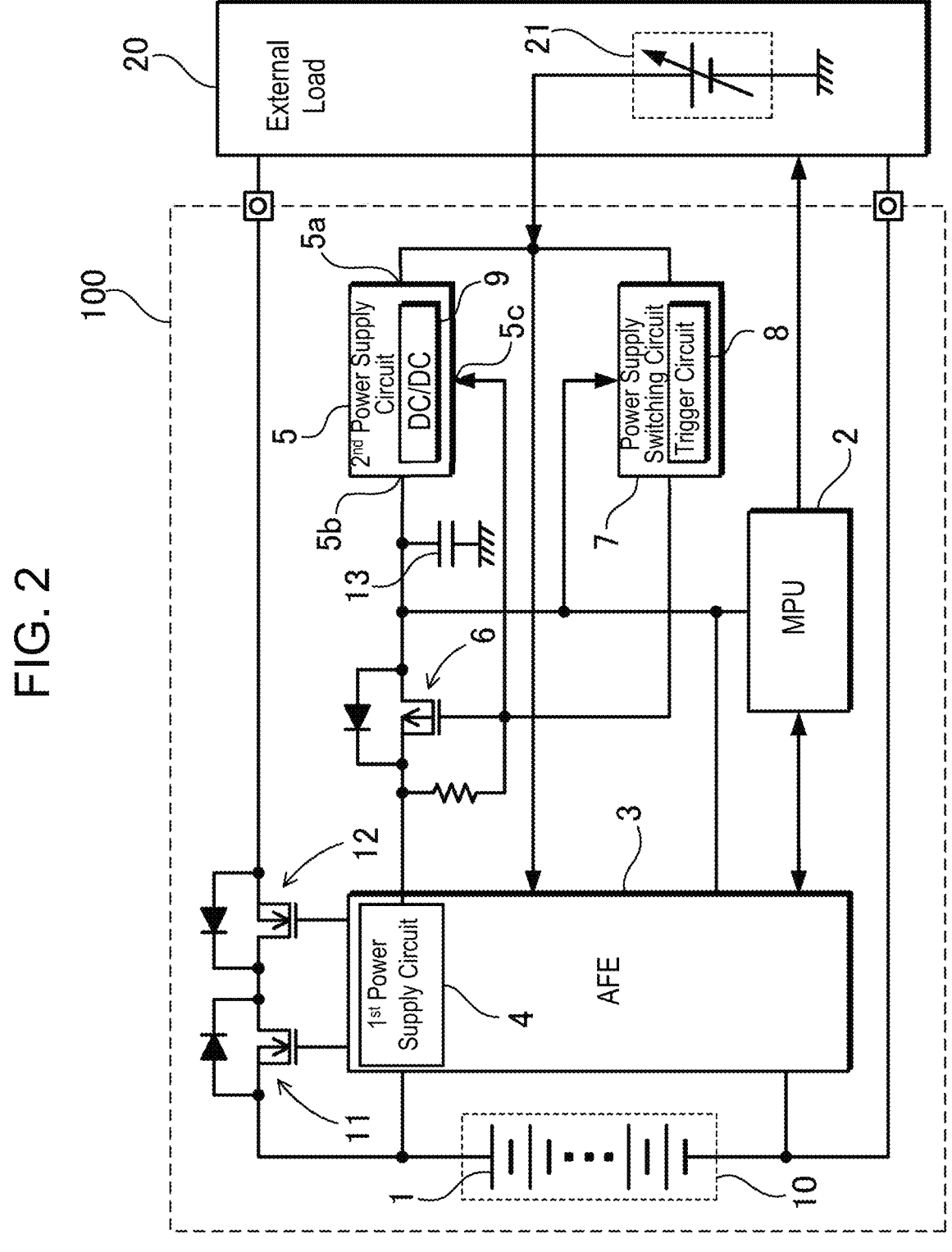
FIG. 2 is a circuit diagram of a backup power supply according to an exemplary embodiment of the present disclosure.

Backup power supply 100 illustrated in FIG. 2 includes: battery module 10 including battery cells 1; analog front end (AFE) 3 and micro-processing unit (MPU) 2 that are connected to battery module 10; first power supply circuit 4 configured to supply a power supply voltage from battery module 10 to MPU 2; switching element 6 configured to supply power supply voltage from first power supply circuit 4 to MPU 2, second power supply circuit 5 configured to convert external power supplied from externally-connected external load 20 into the power supply voltage of MPU 2 and supply the power supply voltage to MPU 2; and power supply switching circuit 7 configured to detect an input of external power from main power supply 21 of external load 20 so as to control switching element 6. In an input period during which external power is supplied from external load 20, power supply switching circuit 7 is configured to turn off switching element 6 to stop supplying the power supply voltage from first power supply circuit 4 to MPU 2, and to supply power supply voltage from the second power supply circuit 5 to MPU 2. In a non-input period during which no external power is supplied from external load 20, power supply switching circuit 7 is configured to turn on switching element 6 so as to supply power supply voltage from first power supply circuit 4 to MPU 2. Specifically, at the time when external load 20 starts supplying external power, power supply switching circuit 7 switches switching element 6 from being turned on to being turned off to stop supplying the power supply voltage from first power supply circuit 4 to MPU 2, and to supply the power supply voltage from second power supply circuit 5 to MPU 2. Moreover, at the time when external load 20 stops supplying the external power, power supply switching circuit 7 switches switching element 6 from being turned off to being turned on so as to supply the power supply voltage from first power supply circuit 4 to MPU 2.

Battery Module 10

Battery module 10 includes battery cells 1 connected in series or parallel to one another. Backup power supply 100 is configured to be connected to external load 20, such as a server. Backup power supply 100 is configured to supply power to external load 20 and maintain external load 20 to operate when power is not supplied to external load 20 from main power supply 21 in the event of a power failure. The time period during which backup power supply 100 maintains external load 20, such as a server, to operate in the event of a power failure is longer than a time period to start an engine generator or a time period to allow the server to successfully perform termination processing. Battery module 10 adjusts output voltage according to the number of battery cells 1 connected in series to one another, and adjusts output current and overall charge and discharge capacity according to the number of battery cells 1 connected in parallel to one another. Battery module 10 may have a capacity continuously supplying power supply voltage to external load 20 for several minutes. Lithium-ion rechargeable batteries may be used for battery cells 1. While lithium-ion rechargeable batteries have large charge and discharge capacities, the present disclosure does not specify battery cell 1. Any other rechargeable batteries, such as solid-state batteries, can also be used.

MPU 2, AFE 3

MPU 2 is an integrated circuit that includes a microprocessor that digitally processes and monitors battery information, such as a voltage, a current, and a temperature of battery module 10. MPU 2 is configured to detect, e.g., a remaining capacity and degree of degradation of battery module 10, and control charging and discharging of battery module 10 to maintain battery module 10 in health. AFE 3 is configured to detect an analog signal corresponding to the voltage, current, or temperature of battery module 10, and controls turning on and off of charge switching element 11 and discharge switching element 12 that control charging and discharging of battery module 10.

AFE 3 converts the detected analog signal into a digital signal, and transmits the digital signal to MPU 2. MPU 2 processes the digital signal input from AFE 3 and outputs the processed result to AFE 3, and further outputs information, such as remaining capacity and the degree of degradation to external load 20. MPU 2 is always maintained to operate regardless of the state of external load 20 to monitor battery module 10. The power supply voltage is supplied to MPU 2 from either battery module 10 or main power supply 21 of external load 20 for powering MPU 2 so as to always maintain MPU 2 to operate.

First Power Supply Circuit 4

First power supply circuit 4 adjusts the output voltage of battery module 10 to the power supply voltage of MPU 2, and supplies the power supply voltage to MPU 2. First power supply circuit 4 converts the voltage of battery module 10 into the power supply voltage of MPU 2 and outputs the power supply voltage in the input period and the non-input period of the external power. First power supply circuit 4 supplies the power supply voltage to MPU 2 via switching element 6. Switching element 6 is turned on in the non-input period during which external power is not supplied, so that the power supply voltage is supplied from first power supply circuit 4 to MPU 2. Backup power supply 100 in FIG. 2 includes first power supply circuit 4 of AFE 3 of the integrated circuit. However, first power supply circuit 4 may not necessarily be included in AFE 3, but may be disposed as a circuit external to AFE 3. First power supply circuit 4 always outputs the output voltage of battery module 10 as the power supply voltage of MPU 2.

Second Power Supply Circuit 5

Second power supply circuit 5 converts the voltage of the external power supplied from main power supply 21 of external load 20 into the power supply voltage of MPU 2 and outputs the power supply voltage. Second power supply circuit 5 includes power supply terminal 5a configured to receive the external power, output terminal 5b configured to supply power supply voltage to MPU 2, and control terminal 5c configured to control the time period during which power supply voltage is output from power supply terminal 5a to MPU 2. Second power supply circuit 5 includes DC-to-DC converter 9 configured to convert the voltage of external power into the power supply voltage of MPU 2. DC-to-DC converter 9 is powered by the external power input from power supply terminal 5a to operate. The output of DC-to-DC converter 9 is controlled by an activation signal input to control terminal 5c. One of the "High" and "Low" levels of an activation signal serves as an activation signal that supplies power supply voltage to MPU 2, and the other one of the "High" and "Low" levels of the activation signal serves as a non-activation signal that switches the supply state into a state where no power supply voltage is supplied to MPU 2.

Backup power supply 100 illustrated in FIG. 2 includes capacitor 13 connected to on the output side of second power supply circuit 5. Capacitor 13 reduces sudden changes in power supply voltage supplied from second power supply circuit 5 to MPU 2. The backup power supply with the configuration above stably supplies power supply voltage to MPU 2 by reducing changes in the power supply voltage supplied to MPU 2 using capacitor 13 at the time of switching between first power supply circuit 4 and second power supply circuit 5. Capacitor 13 has a capacitance of, e.g., 0.45 μF or more, which ideally reduces changes in voltage at the time of switching between the first power supply circuit and the second power supply circuit, leading to a stable supply of the power supply voltage to the MPU 2.

Switching Element 6

Switching element 6 is a semiconductor switching element. Switching element 6 may employ a field effect transistor (FET), but may employ a bipolar transistor. The FET is turned on and off in response to a gate input voltage. Switching element 6 supplies the power supply voltage from second power supply circuit 5 to MPU 2 while switching element 6 is turned on, and stops supplying the power supply voltage from second power supply circuit 5 to MPU 2 while switching element 6 is turned off.

Power Supply Switching Circuit 7

Power supply switching circuit 7 is configured to control switching element 6 and second power supply circuit 5 by determining an input period during which external power is supplied from main power supply 21 of external load 20 and a non-input period during which no external power is supplied. Power supply switching circuit 7 performs the control such that, in the input period, the power supply voltage is supplied to MPU 2 only from second power supply circuit 5 out of first power supply circuit 4 and second power supply circuit 5. Power supply switching circuit 7 further performs the control such that, in the non-input period, the power supply voltage is supplied to MPU 2 only from first power supply circuit 4 out of first power supply circuit 4 and second power supply circuit 5.

Power supply switching circuit 7 includes trigger circuit 8 configured to output an activation signal when the voltage of the input external power exceeds a threshold. Power supply switching circuit 7 including trigger circuit 8 is configured to switch between switching element 6 and second power supply circuit 5 at an appropriate time in response to an input of the external power with a time delay in voltage increase. The external power is supplied from main power supply 21 included in external load 20. However, a time delay may occur in main power supply 21 until the voltage of the external power supplied to second power supply circuit 5 increases to a predetermined value (e.g., 12 V). The time delay occurs due to, for example, the charging time of a large capacitance capacitor connected to the output or input side of main power supply 21. For the external power whose voltage gradually increases, the time when the voltage exceeds the threshold is determined to be the start time of the input period. This configuration allows power supply voltage to be stably supplied from second power supply circuit 5 to MPU 2.

For example, in a circuit configuration assuming that the time delay for the voltage of external power which gradually increases to increase to the predetermined voltage is 2 msec, and the time delay of the voltage to exceed the threshold is 1 msec, switching element 6 and second power supply circuit 5 may supply power supply voltage to MPU 2 in the following periods.

Time Period During which Voltage of External Power is Threshold or Lower

In this period, although the external power is input, the voltage of the external power has not increased to the threshold. In this period, although DC-to-DC converter 9 of second power supply circuit 5 operates, the output of DC-to-DC converter 9 is not supplied to MPU 2.

Time Period During which Voltage of External Power Exceeds Threshold

When the voltage of the external power increases and exceeds the threshold, trigger circuit 8 outputs an activation signal. The activation signal turns off switching element 6 to stop supplying power from first power supply circuit 4 to MPU 2 and supply a power supply voltage from second power supply circuit 5 to MPU 2.

Trigger circuit 8 outputs a stop signal when the voltage of the external power becomes lower than or equal to the threshold at the time of switching from the input period to the non-input period. The voltage of the external power input from main power supply 21 of external load 20 gradually decreases when the power is not supplied to main power supply 21 of external load 20 due to, for example, a power failure. In this state, second power supply circuit 5 does not supply a power supply voltage to MPU 2. Hence, power supply voltage needs to be supplied from first power supply circuit 4 to MPU 2. Trigger circuit 8 detects that the voltage of the external power gradually decreases and becomes lower than the threshold and outputs a stop signal. In this operation, when the external power gradually decreases, trigger circuit 8 switches second power supply circuit 5 and switching element 6 at an appropriate time at which the power supply voltage is stably supplied from second power supply circuit 5 to MPU 2, so that supply of the power supply voltage to MPU 2 from second power supply circuit 5 is switched to from first power supply circuit 4. Trigger circuit 8 outputs a stop signal at the time when the gradually decreasing external power voltage becomes less than or equal the threshold, and switches switching element 6 from being turned off to being turned on. In this operation, power supply voltage is supplied to MPU 2 in the period during which the output voltage of second power supply circuit 5 is lower than the output voltage of first power supply circuit 4.

For example, in a circuit configuration assuming that the time delay for the voltage of external power which gradually increases to increase to a predetermined voltage is 2 msec, and the time delay for the voltage to become equal to or lower than the threshold value is 1 msec, switching element 6 and second power supply circuit 5 supply power supply voltage to MPU 2 in the following periods.

Time Period During which Voltage of External Power has not Decreased to Threshold The voltage of the external power input from main power supply 21 gradually decreases due to a power failure or the like. In the period during which the voltage has not decreased to the threshold, second power supply circuit 5 supplies power supply voltage to MPU 2.

Time Period During which Voltage of External Power is Lower than Threshold

When the voltage of the external power decreases to equal to or lower than the threshold, trigger circuit 8 outputs a stop signal. The stop signal switches switching element 6 from being turned off to being turned on to supply power supply voltage from first power supply circuit 4 to MPU 2. The voltage of the external power supplied from main power supply 21 to second power supply circuit 5 is lower than the threshold, and the output voltage from second power supply circuit 5 decreases. Therefore, second power supply circuit 5 supplies a voltage lower than the power supply voltage to MPU 2. This configuration eliminates a problem that a high voltage is supplied to the output side of first power supply circuit 4.

INDUSTRIAL APPLICABILITY

A backup power supply according to the present disclosure is suitably used as a backup power supply that supplies power to a connected external load to keep the external load in an operating state in the event of, e.g., a power failure of a commercial power supply.

REFERENCE MARKS IN THE DRAWINGS

100 backup power supply
1 battery cell
2 MPU
3 AFE
4 first power supply circuit
5 second power supply circuit
5*a* power supply terminal
5*b* output terminal
5*c* control terminal
6 switching element
7 power supply switching circuit
8 trigger circuit
9 DC-to-DC converter
10 battery module
11 charge switching element
12 discharge switching element
13 capacitor
20 external load
21 main power supply
90 backup power supply
91 battery module
92 MPU
92*a* power supply terminal
93 AFE

94 first power supply circuit
95 second power supply circuit
96 diode
99 main power supply

The invention claimed is:

1. A backup power supply configured to be connected to an external load including a main power supply, the backup power supply comprising:
- a battery module including a plurality of battery cells;
- a micro-processing unit (MPU) connected to the battery module;
- a first power supply circuit configured to supply a power supply voltage from the battery module to the MPU, the power supply voltage powering the MPU;
- a switching element configured to supply the power supply voltage from the first power supply circuit to the MPU;
- a second power supply circuit configured to convert external power into the power supply voltage to supply the power supply voltage to the MPU, the external power being supplied from the main power supply of the external load connected; and
- a power supply switching circuit configured to detect an input of the external power from the main power supply of the external load to the backup power supply so as to control the switching element, wherein:
- the backup power supply is configured such that the first power supply circuit supplies the power supply voltage to the MPU via the switching element, and
- the power supply switching circuit is configured to:
  - in an input period during which the external power is supplied from the external load, turn off the switching element to stop supplying the power supply voltage from the first power supply circuit to the MPU via the switching element and to supply the power supply voltage from the second power supply circuit to the MPU; and
  - in a non-input period during which the external power is not supplied from the external load, turn on the switching element to supply the power supply voltage from the first power supply circuit to the MPU via the switching element.

2. The backup power supply according to claim 1, wherein the second power supply circuit is configured to start outputting the power supply voltage to the MPU in response to an activation signal causing the power supply switching circuit to turn off the switching element.

3. The backup power supply according to claim 1, wherein the power supply switching circuit includes a trigger circuit configured to output an activation signal when a voltage of the external power exceeds a threshold, and
wherein the power supply switching circuit is configured to turn off the switching element in response to the activation signal output from the trigger circuit to cause the second power supply circuit to start supplying the power supply voltage to the MPU.

4. The backup power supply according to claim 3, wherein the second power supply circuit includes:
- a DC-to-DC converter configured to operate upon receiving the external power from the main power supply of the external load; and
- a control terminal configured to supply an output of the DC-to-DC converter to the MPU in response to an input of the activation signal,
wherein the DC-to-DC converter is configured to start outputting the power supply voltage to the MPU in response to the activation signal input to the control terminal, and
wherein the switching element is configured to be turned off in response to the activation signal.

5. The backup power supply according to claim 1, wherein the power supply switching circuit further includes a trigger circuit configured to output a stop signal when a voltage of the external power becomes equal to or less than a threshold, and
wherein the switching element is configured to be switched from being turned off to being turned on in response to the stop signal so as to cause the first power supply circuit to supply the power supply voltage to the MPU.

6. The backup power supply according to claim 1, further comprising
- a capacitor connected to an output side of the second power supply circuit,
wherein the capacitor is configured to reduce a change in the power supply voltage supplied from the second power supply circuit to the MPU.

7. The backup power supply according to claim 6, wherein the capacitor has a capacitance of 0.45 μF or more.

8. The backup power supply according to claim 1, wherein the power supply switching circuit is powered by the external power.

9. The backup power supply according to claim 1, wherein the power supply voltage supplied from the first power supply circuit and the second power supply circuit to the MPU is 5 V.

\* \* \* \* \*